May 28, 1957 A. J. BARACKET 2,794,069

TELEVISION SYNCHRONIZING GENERATOR

Filed June 7, 1954 3 Sheets-Sheet 1

INVENTOR
ALBERT J. BARACKET
BY Ernest Fanwick
ATTORNEY

May 28, 1957 A. J. BARACKET 2,794,069

TELEVISION SYNCHRONIZING GENERATOR

Filed June 7, 1954 3 Sheets-Sheet 2

INVENTOR
ALBERT J. BARACKET
BY Ernest Fanwick
ATTORNEY

May 28, 1957 A. J. BARACKET 2,794,069

TELEVISION SYNCHRONIZING GENERATOR

Filed June 7, 1954 3 Sheets-Sheet 3

INVENTOR
ALBERT J. BARACKE

BY Ernest Fanwick
ATTORNEY 2,794,069
Patented May 28, 1957

2,794,069

TELEVISION SYNCHRONIZING GENERATOR

Albert J. Baracket, Bloomfield, N. J., assignor to International Telephone and Telegraph Corporation, Nutley, N. J., a corporation of Maryland Application June 7, 1954, Serial No. 434,839

12 Claims. (Cl. 178—69.5)

Figure 1A:
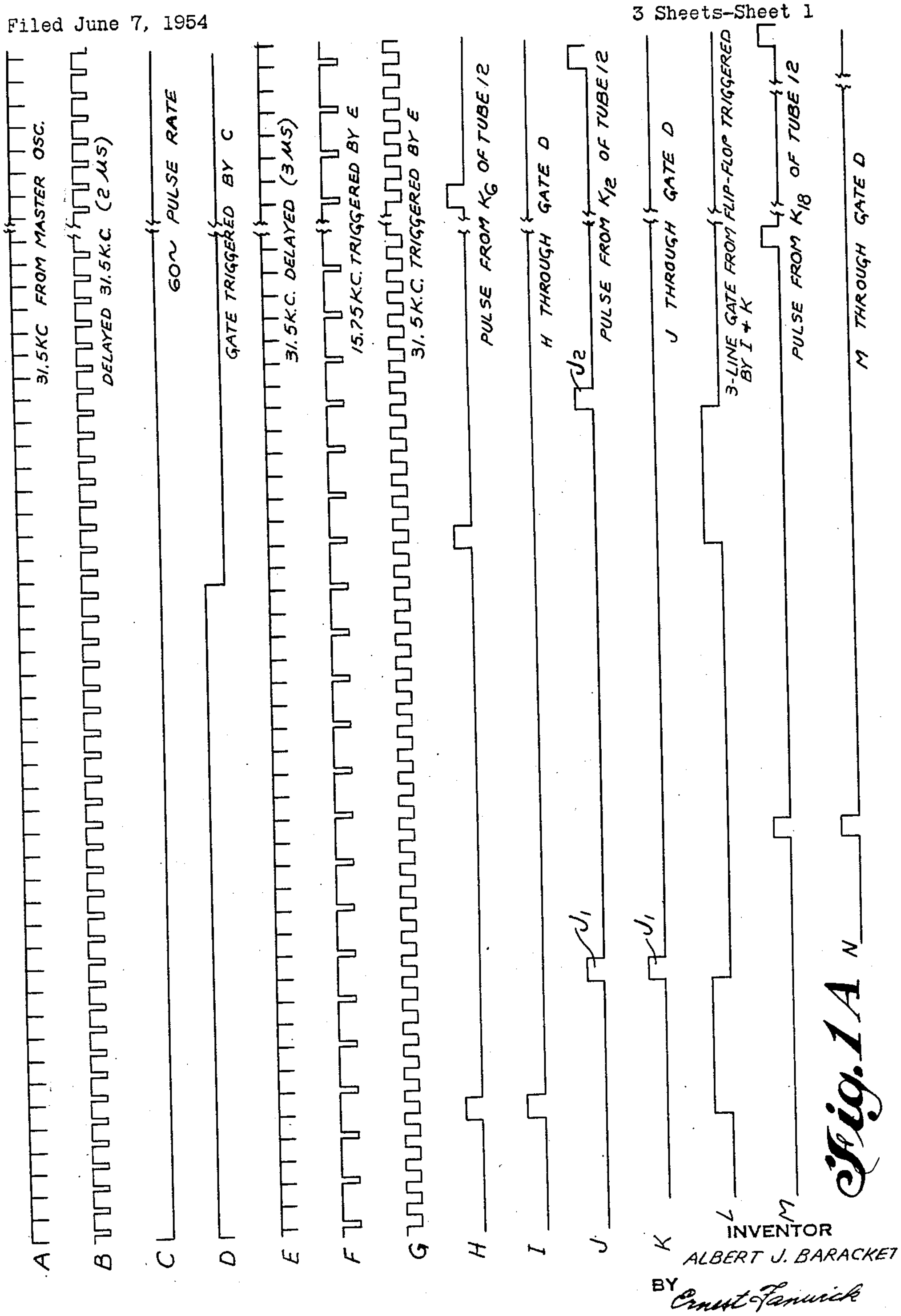

This invention relates in general to generator apparatus for producing timing and synchronizing signals for television systems and more particularly to synchronizing generator apparatus for producing synchronizing signals, including horizontal driving and blanking signals and vertical blanking and driving signals, for television apparatus.

It is well-known that in the art of television transmission the image to be televised is scanned by the transmitting equipment, and it is necessary to synchronize accurately the action of the transmitting apparatus with the equipment which is to reproduce the televised image. The usual television apparatus accomplishes both the scansion and the reproduction of the image by utilizing an electron beam which is moved line by line over the image to be televised, in the case of the transmitter, or over a reproducing surface, in the case of a receiver. Obviously, this linear motion of the electron beam at both the transmitting and receiving ends of the system requires a high degree of synchronization if satisfactory reproduction of the image is to occur.

Usually the linear scansion is accomplished by moving the electron beam in one direction along a single line only and the action of the beam is eliminated while returning to its initial position which may be either of a line or of a field or a complete frame, and thus by "blanking" the return trace portion of the beam motion, the production of well-known undesirable effects is prevented. Obviously a synchronized signal must be produced which will "blank" or negate the action of the electron beam during its return movement to a starting point from which scansion or reproduction will again take place.

In the normal television system the scanning process employed comprises completing the scanning of a frame in an odd number of lines and in an even number, usually two, of fields; the fractional line in each field being employed to effect the interlacing of the two sets of lines forming the complete frame. Apparatus for generating synchronizing, blanking and driving signals are derived by employing a master oscillator operating at a frequency which is equal to the number of lines scanned per second multiplied by the number of fields scanned to complete the scanning of a frame frequency dividing the master oscillator output. Thus, in a 525 line, double interlaced system with a field of repetition rate of 60 per second, the master oscillator would have a frequency of 31,500 cycles per second. In the past it has been usual to divide the master oscillator frequency by two in order to obtain the line synchronizing frequency and in a separate dividing chain to divide the master oscillator frequency by factors of 15, 7 and 5 to obtain the field synchronizing frequency. This somewhat elaborate process requiring a great number of separate dividing circuits has been adopted due to the apparent necessity for employing a common multiple of the field and line frequencies as the master oscillator frequency so that each of these frequencies may be derived therefrom by division of integral numbers.

Obviously this known system has several disadvantages, for example, the provision of multiple frequency dividing stages for deriving the line frequency from the master oscillator frequency is obviously wasteful of equipment. The necessity of utilizing a dividing chain composed of a plurality of dividing circuits requires a large number of electron tubes, each of which adds to the weight, complexity and cost of the television apparatus. In the past it has also been found necessary to utilize a plurality of time delay devices each of which contributed to the expense and complexity of the synchronizing generator.

The present invention has as one of its objects to provide an improved apparatus for generating signals for accomplishing the proper synchronization between the movement of the scanning means forming part of a transmission apparatus and the movement of the portion of the television receiving apparatus which reproduces the transmitted image.

Another object of the present invention is to overcome the above disadvantages of the known synchronizing signal generators by reducing the number of dividing circuits and time delay devices needed and thus reducing the cost and complexity of the television apparatus.

In general, my apparatus is particularly adapted for development of synchronizing, blanking and driving signals for use in an odd line interlaced type of television transmission. Present United States standards contemplate the use of 525 lines to the complete image with alternate line interlacing accomplished at the rate of 60 interlaced fields to the complete image or a transmission speed of 30 complete images per second. My invention contemplates the provision of a master oscillator operating at a frequency equal to the number of lines scanned per second multiplied by the number of fields scanned to complete the scanning of a frame. The 31,500 cycle pulses from the master oscillator are impressed onto a gas counter tube having a common cathode and 25 anodes. By obtaining the outputs from the sixth, twelfth and eighteenth anodes, this single gas counter tube functions as a time delay device simultaneously with its functioning as a 25:1 dividing circuit. The output from the twenty-fifth anode is coupled to a second gas counter tube having 21 anodes and thus a frequency division within the two tubes of 525 to 1 is available which yields as its ultimate output the field synchronizing frequency of 60 cycles per second. The multiple outputs from the first counter tube are each coupled to a gate circuit as are the other pulse groups. The gate circuits are controlled by matching means which are responsive to the output of the second counter tube. The outputs of the gate circuits are coupled to a combining circuit whose output comprises the device composite synchronizing signal.

Figure 1B:
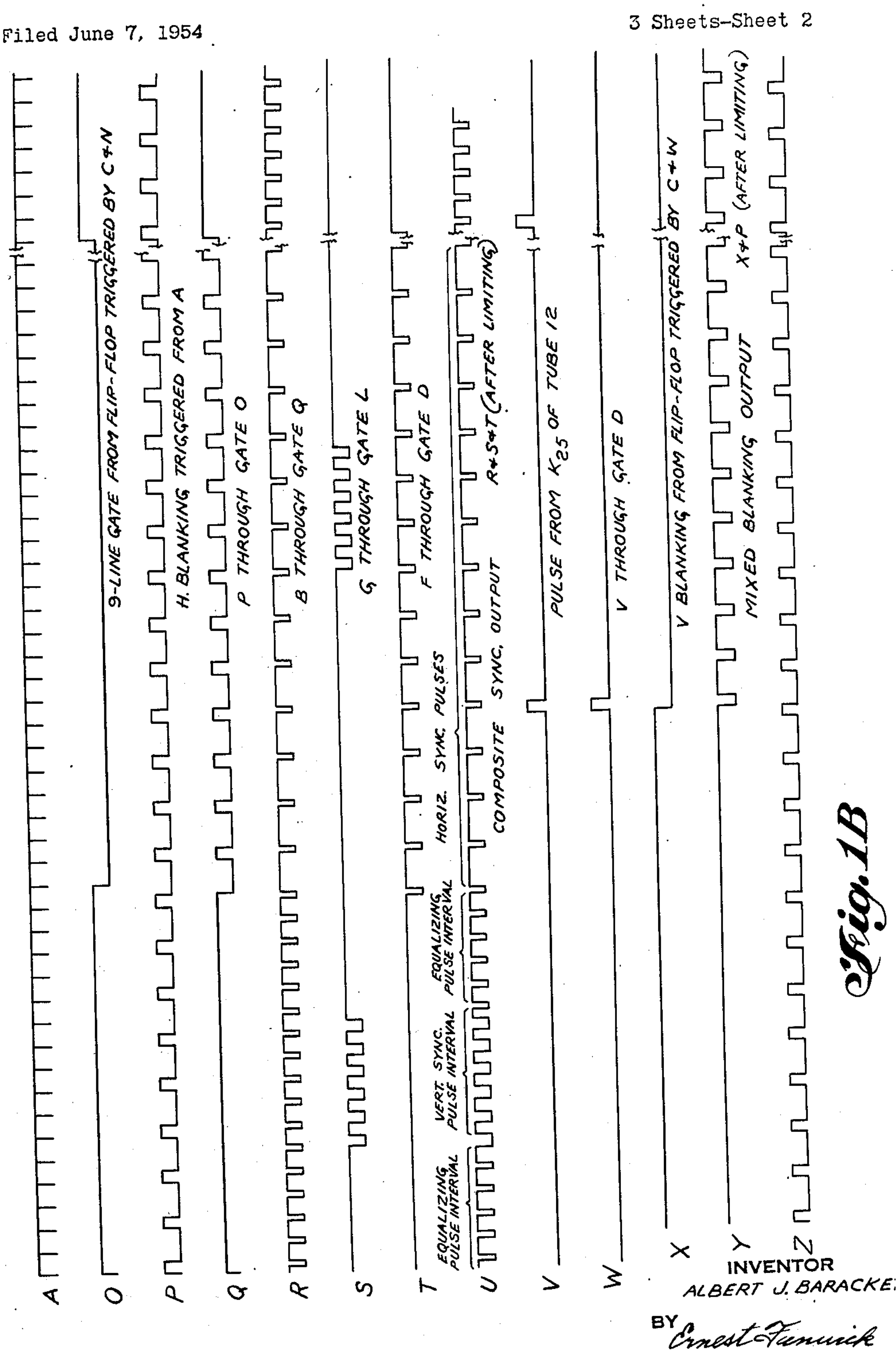
Figure 2:
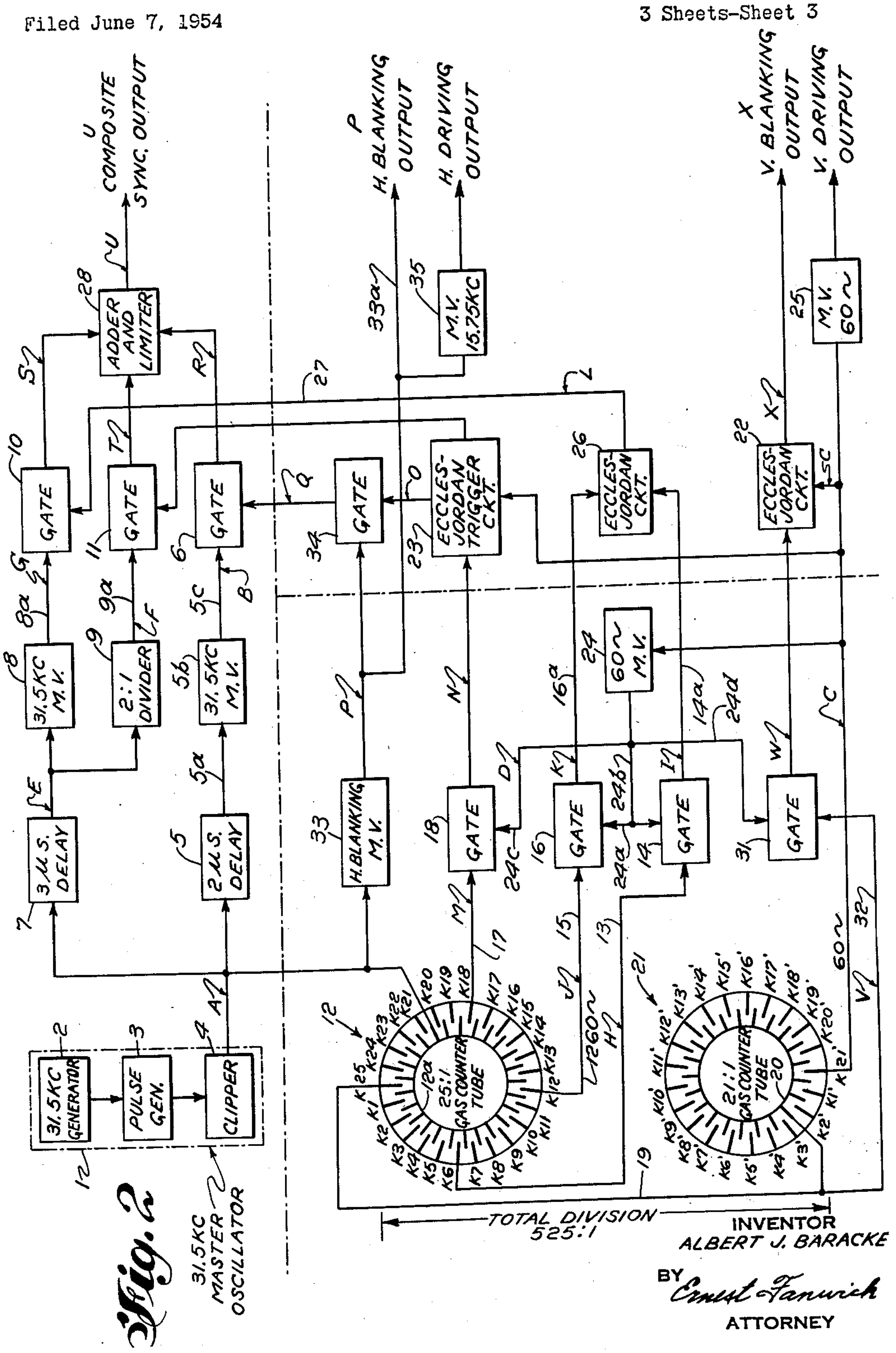

The above-mentioned and other features and objects of this invention will become more apparent by reference to the following description taken in conjunction with the accompanying drawings, in which:

Figs. 1A and 1B are a set of explanatory curves showing the waveform and phase relationship of various curves developed during the generation of the synchronizing, blanking and driving signals; and Fig. 2 is a schematic diagram in block form of a television synchronizing generator in accordance with the provisions of my invention.

Referring to Figs. 1A and 1B, there is shown a set of explanatory curves showing various pulses and waveforms developed in the generation of the synchronizing, driving and blanking signals transmitted and indicating the phase relationships between the various signals developed in the generator of this invention. For purposes of clarity and ease of illustration, these curves have been broken away in parts, thus compressing the time scale and this has been indicated in the drawings. The derivation of these curves and their relationship each to the other will be explained more fully hereinafter in the specification when explaining the operation of the apparatus involved.

Referring to Fig. 2 of the drawing, there is shown a schematic diagram in block form illustrating the television synchronizing generator of my invention devoted to the generation of synchronizing, driving and blanking signals for use primarily at the transmitter of a television system to synchronize the scanning of the pick-up or camera tube.

In general a master oscillator 1 produces a group of pulses which recur at a certain frequency and are coupled to delay lines 5 and 7 and multivibrators 5*b* and 8 and divider 9 to form groups of pulses recurring in fixed time relation to the output of oscillator 1. In addition the output of oscillator 1 is coupled to the counter tubes 12 and 21. A plurality of groups of pulses are taken from a plurality of cathodes, each group having a pulse repetition rate less than the frequency of oscillator 1. The various groups of pulses develop control signals in circuits 50 which selectively operate the switching means 51 to control a plurality of gates 52. Thus, in effect, the various groups of pulses produced from the output of the master oscillator 1 are combined in predetermined time relations to provide the desired television synchronizing signals.

The 31,500 cycle master oscillator 1 comprises generator 2 which produces a sine wave signal having a frequency of 31.5 kc. The 31.5 kc. sine wave output of generator 2 is impressed onto a pulse generator 3 whose output is passed through a clipper circuit 4, to develop a series of sharp pulses or pips having a frequency of 31,500 per second as shown in curve A of Fig. 1A. The series of pips at a frequency of 31.5 kc. comprises the output of the master oscillator 1. A portion of the output of the master oscillator 1 from clipper circuit 4 is coupled to delay line 5 where a 2 microsecond delay is imparted to the sharp pulses before they are coupled via line 5*a* to a 31.5 kc. multivibrator circuit 56 whose output comprises a series of pulses at a repetition rate of 31.5 kc. which are triggered by the delayed pip output of delay line 5. The output of the multivibrator 5*b* is shown in curve B, Fig. 1A, as having a 2 microsecond delay when compared to the pulses of curve A. The output of the 31.5 kc. multivibrator 5*b* is coupled over line 5*c* to the gate circuit 6, the function of which including reference to curves C and D will be explained more fully hereinafter.

Another portion of the sharp pulse output of the master oscillator 1 is coupled to a second delay line 7 where a 3 microsecond delay is imparted to the pulsed output of the clipper circuit 4 such as indicated in curve E before the pulses are fed to a 31.5 kilocycle multivibrator 8 and a 2:1 divider circuit 9. The 2:1 divider circuit 9 may be of any of the well-known divider circuit types. The output of divider circuit 9, as shown in curve F, Fig. 1A, comprises a series of pulses having a repetition rate of 15.75 kc. or one-half the frequency of the input signal shown by curve E and each pulse of curve F has a 3 microsecond delay when compared to the pips of curve A since they were triggered by the delayed pips of curve E. It is readily apparent that the delay lines 5 and 7 may be combined into a single delay line having two taps, one at the 2 microsecond point and one at the 3 microsecond point. The output of the divider circuit 9, comprising the series of pulses shown in curve F having a frequency of 15.75 kc., is coupled over line 9*a* to a gate circuit 11, and the 31.5 kc. output of multivibrator 8, which is shown in curve G to comprise a series of pulses at a frequency of 31.5 kc., is coupled over line 8*a* to a gate circuit 10 whose function will be hereinafter explained.

The 31.5 kc. output of master oscillator 1 shown in curve A, Fig. 1A is also coupled to the anode 12*a* of gas counter tube 12. In this specification, when reference is made to a counter tube, one example of what is meant is a cold cathode gaseous discharge tube of the type disclosed in U. S. patents to M. W. Wallace No. 2,642,548 and J. J. B. Lair No. 2,651,740 having a number of cathode-anode discharge gaps which are designed to fire in succession in a predetermined order when pulses of electrical energy are applied to all the gaps simultaneously because the ionization of an unfired gap is caused by the discharge in an adjoining fire gap. The gaps are so arranged that the first pulse of electrical energy applied to the gas counter tube will only fire a predetermined starting gap due to the closer spacing of the electrodes of the starting gap or to a bias potential which is applied solely to the starting gap or to the provision of a permanently discharging gap called a pilot gap adjoining the starting gap and causing the ionization of the starting gap or other measures which may be taken to insure the initial pulse fires only the starting gap. In one type of known discharge gap after a sequence of discharges of the gaps of the tube and when the last gap in the predetermined order has fired all the discharges are extinguished and the tube is allowed to deionize before the commencement of another firing cycle. If it is required to operate such a tube from a continuous sequence of regularly spaced pulses a limit is set to the permissible frequency of pulse repetition by the need for a time interval between pulses long enough to allow the gap to become deionized. For if the gaps remained ionized there would be no guarantee that the starting gap would be fired first, or in preference to the others, in a second or subsequent cycle of pulses. A gaseous discharge tube of the multigap type is known to the prior art having a "memory effect." This effect consists of a rise in the voltage required to fire a gap which follows an extinguished discharge in that gap, when certain electrode materials and gases are used in the construction thereof. It is preferable to use such a tube in the synchronizing generator of my invention when tubes possessing this feature are supplied with pulses to their gaps in common, and with no constant discharge maintaining potential, a gap, once fired, will ionize an adjacent unfired gap and will extinguish at the end of the pulse which fired it. The next pulse will fire the ionized adjacent unfired gap, but will not refire the extinguished gap owing to the aforementioned rise in its critical firing voltage, it being arranged that the pulse amplitude is below the critical voltage. This "memory effect" persists long enough to insure that gaps once fired, will not again fire during the firing cycle of the tube, but when all gaps have fired and all possess the "memory effect," the first gap to recover will be that which has been extinguished for the longer time, i. e., the starting gaps, and this alone will fire on the first pulse of the next cycle. A corresponding decay of the "memory effect" will pass down the gaps of the tube in the predetermined firing order, in advance of the firing sequence so that all in turn are ready to fire from successive pulses. A small bias may be applied to the starting gap to insure that the sequence starts with that gap.

Thus when utilizing a gas counter tube of the aforementioned type the first pip from the master oscillator output 1 will appear at cathode $k_1$ ($k_1$—12*a* comprising the starting gap) and each succeeding input pip will cause the next succeeding cathode $k_2$, $k_3$, $k_4$, etc. to produce a pulse output until all 25 cathodes have been ignited at which time the cycle recommences. Thus, after the sixth input pip from maste oscillator 1 and at every 25th input pip thereafter anode $k_6$ as shown in curve H of Fig. 1A, will produce a pulse output onto transmission line 13, which couples the pulse output of cathode $k_6$ to gate circuit 14. The pulse output of $k_6$ besides being at 1/25 the frequency of the input pip to tube 12 is delayed by a time equal to 6 pips, since only every 25th input pip produces a pulse output on cathode $k_6$ which is coupled to gate 14 the frequency of the pulses along line 13 is 1260 per second. In a similar manner the output of cathode $k_{12}$ as shown in curve J, Fig. 1A, comprises a series of pulses at a frequency of 1260 per second but delayed an additional period of time from the input pips of curve A. This series of pulses is coupled via line 15 to gate circuit 16. Since it requires six additional input pulses from the master oscillator 1 after a pulse has been produced at cathode $k_6$, to produce a pulse output at cathode $k_{12}$ the output along line 15 will be further delayed in time equal to six additional input pips to the anode 12*a* of gas counter tube 12. In a similar manner a series of pulses as shown in curve M of Fig. 1A, having a frequency of 1260 per second are coupled from cathode $k_{18}$ along line 17 to gate circuit 18, but are delayed in time an amount equal to six input pips from the pulse output from cathode 12 or a time delay equal to 18 input pips. A fourth output comprising a series of pulses having a repetition rate of 1260 per second and illustrated in curve V of Fig. 2 is taken from the gas counter tube 12 via cathode $k_{25}$ and coupled over line 19 to the anode 20 of gas counter tube 21. Simultaneously with the coupling of a pulse via line 19 to gas counter tube 21 the cathode-anode discharge cycle in tube 12 is repeated.

The gas counter tube 21 functions as a 21:1 divider since it has 21 cathodes and the output of the 21st cathode will occur only after 21 pulses have been coupled via line 19 to the anode 20 of the tube 21. Thus, the output from gas tube 21 comprises a series of sharp pulses having a 60 cycle repetition rate, as shown in curve C of Fig. 1A and is coupled to Eccles-Jordan trigger circuits 22 and 23 and to 60 cycle multivibrators 24 and 25. The output of the last mentioned 60 cycle multivibrator 25 comprises a series of pulses having a repetition frequency of 60 per second and equals the vertical driving output signals which may be utilized at the television transmission station. The output of the 60 cycle multivibrator 24 as shown by curve D of Fig. 1A, is coupled via line 24*a* to gate 16 whose other input comprises the pulses coupled over line 15 from cathode $k_{12}$ of gas counter tube 12, shown in curve J of Fig. 1. The pulses coupled from cathode $k_{12}$ to gate 16 are passed by the gate during one portion of the output of multivibrator 24. Thus are shown in curve K of Fig. 1 pulse $J_1$ is passed by gate 16 but pulse $J_2$ is blocked by gate 16 and the output of gate 16 comprises a series of pulses when the input from multivibrator 24 and the input pulses coupled to line 15 from cathode $k_{12}$ occur simultaneously. The output from gate 16 shown in curve K is coupled over line 16*a* to an Eccles-Jordan trigger circuit 26, which functions in a manner hereinafter explained.

Another portion of the output of 60 cycle multivibrator 24 shown in curve D of Fig. 1A is coupled over line 24*b* to gate 14 along with the output of cathode $k_6$ shown in curve H of Fig. 1A, which was coupled over line 13. When the pulses coupled from cathode $k_6$ occur simultaneously with the pulse output of multivibrator 24 to the output from gate 14 shown in curve I, Fig. 1A, is coupled over line 14*a* to an Eccles-Jordan type trigger circuit 26 along with the output of gate 16 shown in curve K of Fig. 1A.

The Eccles-Jordan type of trigger circuit usually comprises a two-stage direct coupled amplifier, with the output of the second stage coupled back to the input of the first stage. The Eccles-Jordan circuit is thus similar to a multivibrator, except that direct coupling is used instead of resistance-capacitance coupling. By an Eccles-Jordan type circuit I have reference to a circuit having two quiescent conditions corresponding to the conditions that exist in a multivibrator in the alternate half cycles. Unlike the multivibrator, however, these conditions are stable in the Eccles-Jordan circuit. Input pulses may be applied simultaneously to both grids of the Eccles-Jordan trigger circuit. Under these conditions each time a pulse arises, the Eccles-Jordan circuit jumps to the alternate quiescent condition, irrespective of which quiescent condition existed before the arrival of the pulse.

The output, shown in curve L of Fig. 1A of the Eccles-Jordan trigger circuit 26 is coupled via line 27 to gate 10 along with the 31.5 kc. output of multivibrator 8 coupled over line 8*a* and shown in curve G of Fig. 1A. The gate 10 deletes a portion of the pulse output of multivibrator 8 responsive to the output of trigger circuit 26. The output of gate 10 shown in curve S of Fig. 1B is coupled to the adder and limiter circuit 28.

Another portion of the output of 60 cycle multivibrator 24 shown in curve D of Fig. 1A, is coupled via line 24*c* to gate 18 along with the pulses coupled to line 17 and anode $k_{18}$. The output of gate 18 is coupled to the trigger circuit 23 whose other input comprises the 60 cycle signal shown in curve C, Fig. 1A, obtained from cathode $k_{21}'$ of gas counter tube 21.

One portion of the output of trigger circuit 23 shown in curve O, Fig. 1B, is coupled to gate 11 along with the 15.75 kc. signal from the 2:1 divider circuit 9. The output of the gate 11 illustrated by the waveform of curve T, Fig. 1B, is coupled to adder and limiter circuit 28.

Still another portion of the output of multivibrator 24 is coupled via line 24*d* to gate 31 along with a portion of the output from cathode $k_{25}$ of counter tube 12 which was coupled over line 32 to gate 31. Thus the input to gate 31 is shown in curves D, Fig. 1A and curve V, Fig. 1B. The output of gate 31 is shown in curve W of Fig. 1B and is coupled to the Eccles-Jordan trigger circuit 22 along with the 60 cycle input from cathode $k_{21}'$ of the gas counter tube 21. The output of Eccles-Jordan trigger circuit 22 shown in curve X of Fig. 1B, comprising the gating of the input from circuit 31 shown in curve W, Fig. 1B and the 60 cycle signal shown in curve C, Fig. 1A, comprises the vertical blanking output signal which is coupled to the television transmitter.

A portion of the output energy from master oscillator 1 is coupled to a multivibrator 33, a portion of whose output shown in curve P, Fig. 1B comprises the horizontal blanking output signals coupled over line 33*a*. Another portion of the output of multivibrator 33 is coupled to a 15.75 kc. multivibrator 35 the output of which comprises the horizontal driving output signal at one-half the frequency of the horizontal blanking signals. A further portion of the output of multivibrator 33 is coupled to gate 34 along with the output of Eccles-Jordan trigger circuit 23. The output of gate 34 shown in curve Q, Fig. 1B along with the output of the 2 microsecond delay line 5 shown in curve B, Fig. 1A is coupled to gate circuit 6 whose output shown in curve R, Fig. 1B comprises the third input to the adder and limiter circuit 28.

The output of the adder and limiter circuit 28, curve U, comprises a composite signal of the inputs from gate 10, gate 11 and gate 6 shown in curves S, T and R of Fig. 1B respectively. The composite synchronizing signal of curve U comprises a period for vertical blanking during which the scanning beam is returned from the bottom of the image to the top. The vertical blanking period starts with an equalizing pulse interval of 3.2 horizontal pulses. Following the equalizing pulse interval is a vertical synchronizing pulse interval of 3 horizontal pulses. A second equalizing pulse interval of 3 horizontal pulse duration follows the vertical pulse interval and then horizontal synchronizing pulses are continued until the normal image transmission recommences. This composite synchronous signal output is used for image scanning and is also coupled to the transmitter for transmission to the receiver to assist in reproducing the transmitter image.

A synchronizing generator in accordance with the principles of this invention is seen to utilize multi-element cold cathode gas counter tubes to permit both frequency division and at the same time supply the basic timing information required for keying and shaping the composite synchronizing pulses, blanking and driving pulses.

While I have described above the principles of my invention in connection with specific apparatus, it is to be clearly understood that this description is made only by way of example and not as a limitation to the scope of my invention as set forth in the objects thereof and in the accompanying claims.

I claim:

1. A synchronizing signal generator for television or the like comprising first oscillator means for producing a first group of pulses recurring at a certain frequency, second oscillator means responsive to said first group of pulses for producing groups of pulses recurring in a fixed time relation to said first group of pulses, multi-element counter tube for counting input pulses and for producing a number of output pulses in a given ratio to the number of input pulses, input coupling means coupling said first group of pulses to said counter tube, electrode means associated with said tube for coupling from said counter tube a plurality of groups of said output pulses, each group having a fixed time relation to said certain frequency and having a pulse repetition rate less than said certain frequency and switching and gating circuit means for combining the outputs of said first oscillator means, said second oscillator means and said counter tube in predetermined time relations to provide synchronizing signals for a television system.

2. A synchronizing signal generator for television or the like for producing synchronizing signals and horizontal and vertical driving and blanking pulses comprising first oscillator means for producing a group of pulses occurring at a frequency which is a multiple of the frequency of said synchronizing signals, second oscillator means for producing groups of pulses in which the pulses recur in a fixed time relation to the pulses of said first group of pulses, a first multi-element counter tube, means for coupling said first group of pulses to said first tube, electrode means for coupling from said tube a plurality of groups of pulses, each group from said tube having pulses recurring at a pulse repetition frequency less than said multiple frequency and having a fixed time relation to said multiple frequency pulses, a second multi-element counter tube responsive to one of the said plurality of pulse outputs of said first counter tube for producing a group of pulses at a frequency which is a sub-multiple of said multiple frequency, circuit means responsive to the output of said second tube for combining in certain time relations the outputs of said first oscillator means, second oscillator means, and said first counter tube to provide said synchronizing signals and said horizontal and vertical driving and blanking signals.

3. Apparatus for developing synchronizing signals comprising an oscillator for developing uniformly recurring signals, multi-element counter tube responsive to said recurring signals to effect a counting operation and produce at certain ones of said tube elements output signals having a given ratio to the number of said recurring signals, a plurality of gate circuits each of said gate circuits being coupled to a corresponding one of said certain ones of said tube elements, switching means coupled to said gate circuits, circuit means to develop a plurality of control signals responsive to said uniformly recurring signals, means responsive to said signals developed from said uniformly recurring signals to selectively operate said switching means to control the output of said gate circuits and combining means for the gated outputs controlled by said switching means.

4. In a television system for the production of an image at a certain field synchronizing frequency and at a certain line scanning frequency, a synchronizing signal generator comprising a master oscillator for producing pulses at double said scanning line frequency, first means for producing groups of pulses in which the pulses occur at said oscillator frequency and having a fixed time relation to said oscillator output, a first multi-element counter tube responsive to the output of said oscillator to produce a plurality of groups of pulses each having a pulse repetition rate which is a sub-multiple of said oscillator frequency and each group of said plurality of groups having a different fixed time relation to the output pulses of said oscillator, a second multi-element counter tube responsive to one of the outputs of said first tube for producing pulses at said field synchronizing frequency, a plurality of gate circuits, means for coupling said pulses at said master oscillator frequency and said sub-multiple frequency and the output from said first multielement counter tube into said gate circuits, switching means coupled to said gate circuits, means to develop a plurality of control signals responsive to the output of said oscillator means, means to selectively operate said switching means responsive to said control signals to control the output of said gate circuits and combining means for the outputs controlled by said switching means.

5. A synchronizing signal generator in accordance with claim 4 wherein said first and second multi-element counter tubes each comprise an electrode array, said array having a common anode and a plurality of spaced cathodes, said anode defining a series of spaced sequential discharge gaps with said cathodes.

6. A synchronizing signal generator in accordance with claim 4 wherein said first and second multi-element counter tubes each comprise an electrostatically operated cold cathode gas discharge tube having a plurality of discharge gaps arranged adjacent each other so that firing of one gap produces ionization migration to the next gap thereby priming the next gap for sequential firing in a predetermined succession, said tubes having a common anode and a plurality of spaced cathodes defining a series of spaced sequential discharge gaps.

7. A synchronizing signal generator according to claim 6 wherein said first multi-element counter tube has 25 cathodes and said plurality of outputs is obtained from the 6th, 12th, 18th and 25th of said cathodes and said second multi-element tube has 21 cathodes.

8. A generator for use in television or the like for developing synchronizing blanking and driving signals for use in an odd line interlaced field type television system comprising oscillating means for generating a first group of pulses at a certain frequency which is a multiple of the number of lines scanned per second and the number of fields scanned to complete the scanning of a frame, first means for producing a plurality of groups of pulses having a fixed time relation to the output of said oscillator, multi-element counter tube means responsive to the output of said oscillating means to provide a plurality of pulse output groups each having the same pulse repetition frequency which is a sub-multiple of said certain frequency and each output having a different fixed time relation to the output of said oscillating means, second means responsive to one of the outputs of said tube to develop a second group of pulses having a frequency equal to the field synchronizing frequency, a plurality of gate circuits, means for couping the output of said first means and said counter tube into said gate circuits, means to develop a plurality of control signals responsive to said first group of pulses, switching means coupled to said gate circuit, means to selectively operate said switching means responsive to said control signals to control the output of said gate circuits and combining means for the outputs controlled by said switching means.

9. In a television system for the production of a picture at a certain field synchronizing frequency and at a certain scanning line frequency, a synchronizing signal generator comprising a master oscillator for producing pulses at a certain frequency which is a multiple of said line scanning frequency and said field synchronizing frequency, first means for producing first groups of pulses at said master oscillator frequency and having fixed time relations to a given cyclic output of said oscillator, second means responsive to the output of said master oscillator for producing a second group of pulses at a frequency equal to said line scanning frequency, a first multi-element counter tube having a plurality of counting elements responsive to the output of said master oscillator to produce a plurality of groups of pulses at a frequency which is a sub-multiple of said master oscillator frequency and each group having a fixed time relation to said given cyclic output of said oscillator, a second multi-element counter tube of a plurality of counting elements responsive to one of the outputs of said first tube for producing impulses at a particular frequency equal to said master oscillator frequency divided by the product of the number of counting elements in said first and second counting tubes, a plurality of gate circuits, means for coupling said pulses at said oscillator frequency and said sub-multiple frequency and said line scanning frequency into said gate circuits, switching means coupled to said gate circuits, means to develop a plurality of control signals responsive to said first group of pulses, means to selectively operate said switching means responsive to said control signals at said particular frequency developed from the output of said second tube to control the output of said gate circuits and combining means for the outputs controlled by said switching means.

10. A synchronizing signal generator according to claim 9 wherein said master oscillator frequency is equal to double said scanning line frequency and said particular frequency is equal to said field synchronizing frequency.

11. A synchronizing signal generator for television or the like comprising first oscillator means for producing a first group of pulses recurring at a certain frequency, second oscillator means responsive to said first group of pulses for producing groups of pulses recurring in a fixed time relation to said first group of pulses, ring counter means having a plurality of identical units, each of said units having a first and second stable energy state and said units being so interrelated that a pulse coupled to one of said units causes said unit to go from its first to its second stable energy state if the immediately preceding unit in said ring is in said second stable energy state, input coupling means coupling said first group of pulses to the units of said ring counter means to cause said change in energy state to proceed from one unit to the next succeeding unit around said ring counter means, output coupling means for coupling from said ring counter means a plurality of groups of pulses, each group having a fixed time relation to said certain frequency and having a pulse repetition rate less than said certain frequency and switching and gating circuit means for combining the outputs of said first group of pulses, second group of pulses and the output of said ring counter means in predetermined time relation to provide synchronizing signals for a television system.

12. In a television system for the production of an image at a certain field synchronizing frequency and at a certain line scanning frequency, a synchronizing signal generator comprising a master oscillator for producing pulses at double said scanning line frequency, first means for producing groups of pulses in which the pulses occur at said oscillator frequency and having a fixed time relation to the oscillator of said output, a first multi-unit ring counter circuit having a plurality of identical units, each of said units having a first and second stable energy state and so interrelated that a pulse causes a change from the first to second stable energy state in one of said units provided the immediately preceding unit in said ring is in said second stable energy state, said first ring counter circuit being responsive to the output of said oscillator to produce a plurality of groups of pulses each having a pulse repetition rate which is a sub-multiple of said oscillator frequency and each group of said plurality of groups having a different fixed time relation to the output pulses of said oscillator, a second multi-unit ring counter circuit responsive to the change in energy state of one of the units of said first ring counter circuit for producing pulses at said field synchronizing frequency, a plurality of gate circuits, means for coupling the pulses at said master oscillator frequency, said sub-multiple frequency and from said first counter circuit into said gate circuits, switching means coupled to said gate circuits, means to develop a plurality of control signals responsive to the output of said oscillator means, and means to selectively operate said switching means responsive to said control signals to control the output of said gate circuits.

References Cited in the file of this patent

UNITED STATES PATENTS

| | | |
|---|---|---|
| 2,515,613 | Schoenfeld | July 18, 1950 |
| 2,570,775 | De Baun | Oct. 9, 1951 |